US010944489B2

United States Patent
Mochizuki

(10) Patent No.: US 10,944,489 B2
(45) Date of Patent: Mar. 9, 2021

(54) ACTIVE ANTENNA SYSTEM, COMMUNICATION DEVICE, CALIBRATION METHOD OF ACTIVE ANTENNA SYSTEM AND RECORDING MEDIUM

(71) Applicant: NEC CORPORATION, Tokyo (JP)

(72) Inventor: Takuji Mochizuki, Tokyo (JP)

(73) Assignee: NEC CORPORATION, Tokyo (JP)

(*) Notice: Subject to any disclaimer, the term of this patent is extended or adjusted under 35 U.S.C. 154(b) by 115 days.

(21) Appl. No.: 16/049,118

(22) Filed: Jul. 30, 2018

(65) Prior Publication Data

US 2019/0044624 A1 Feb. 7, 2019

(30) Foreign Application Priority Data

Aug. 2, 2017 (JP) .............................. JP2017-150026

(51) Int. Cl.
*H04B 17/12* (2015.01)
*H04B 7/0452* (2017.01)
*H04L 5/14* (2006.01)
*H04W 72/08* (2009.01)
*H04L 5/00* (2006.01)
*H04B 7/26* (2006.01)
(Continued)

(52) U.S. Cl.
CPC .............. *H04B 17/12* (2015.01); *H04B 7/04* (2013.01); *H04B 7/0452* (2013.01); *H04B 7/2643* (2013.01); *H04B 17/14* (2015.01); *H04L 5/006* (2013.01); *H04L 5/1461* (2013.01); *H04W 72/082* (2013.01)

(58) Field of Classification Search
CPC ........ H04B 7/024; H04B 7/04; H04B 7/0452; H04B 17/0085; H04B 17/10; H04B 17/12; H04B 17/14; H04B 7/2643
USPC ......... 370/252, 278, 280, 328, 329; 455/500
See application file for complete search history.

(56) References Cited

U.S. PATENT DOCUMENTS

2011/0068971 A1* 3/2011 Kusyk .................... H01Q 3/267
342/174
2011/0263280 A1* 10/2011 Guey ..................... H04B 7/024
455/500
(Continued)

FOREIGN PATENT DOCUMENTS

WO 2016/163375 A1 10/2016

*Primary Examiner* — Harun Chowdhury
(74) *Attorney, Agent, or Firm* — Sughrue Mion, PLLC

(57) ABSTRACT

An active antenna system includes: a plurality of antennas; a plurality of switches respectively connected to the antennas, the switches being configured to switch between transmission signal lines and reception signal lines to perform Time Division Duplex; a plurality of transmitter-receivers respectively connected to the transmission signal lines and the reception signal lines; a calibration transmitter connected to the transmission signal lines; a calibration receiver connected to the reception signal lines; and a control unit configured to carry out, during a receiving time of the Time Division Duplex, reception calibration of each of the transmitter-receivers based on a signal transmitted by the calibration transmitter and received by the transmitter-receivers, and, during a transition time from reception to transmission, carry out transmission calibration of each of the transmitter-receivers based on a signal transmitted by the transmitter-receivers and received by the calibration receiver.

11 Claims, 8 Drawing Sheets

(51) Int. Cl.
*H04B 7/04* (2017.01)
*H04B 17/14* (2015.01)

(56) References Cited

U.S. PATENT DOCUMENTS

2012/0281744 A1* 11/2012 Guo .................... H04L 27/2657
375/224
2015/0124634 A1* 5/2015 Harel ....................... H04B 7/04
370/252

* cited by examiner

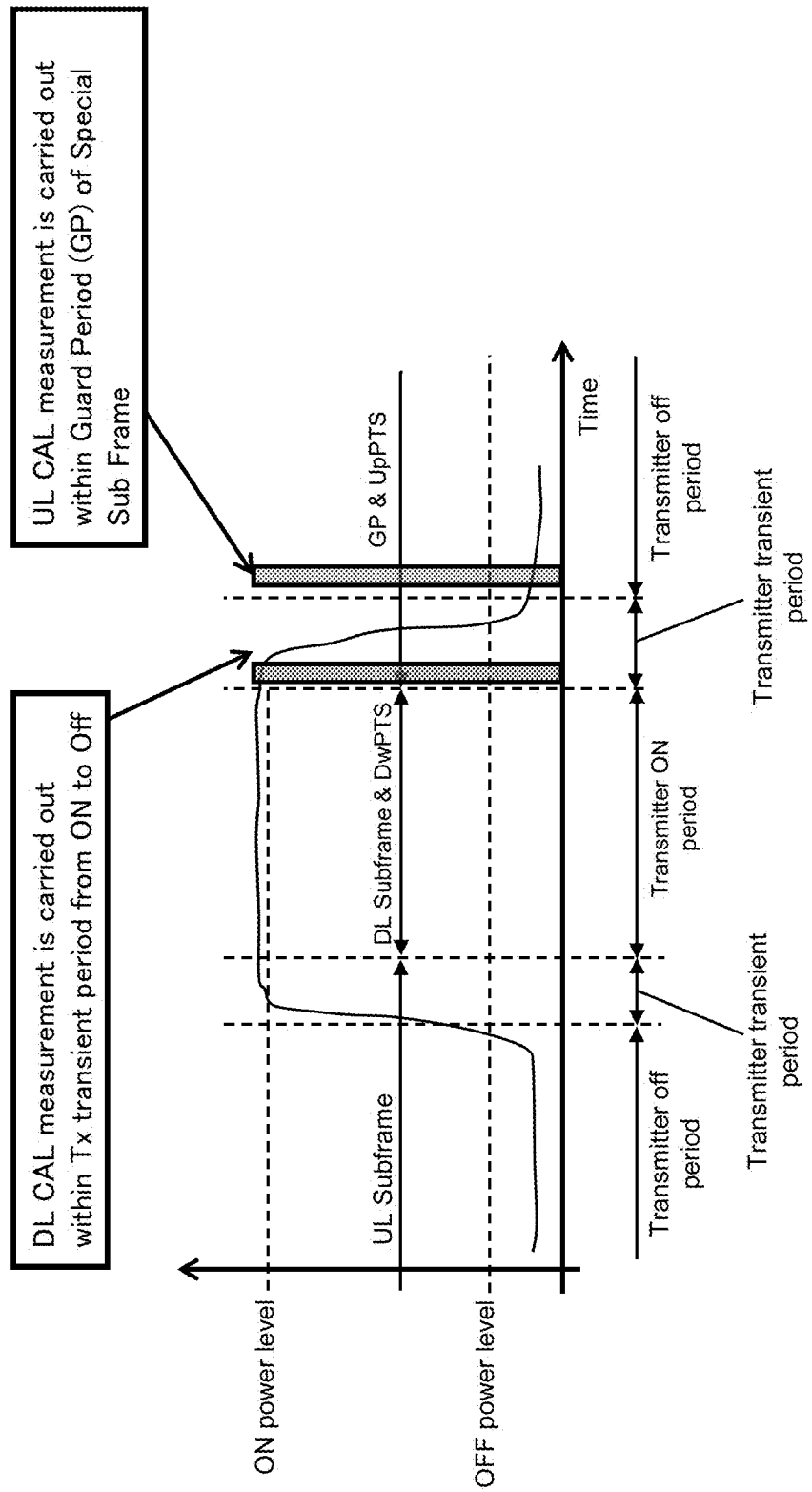

ACTIVE ANTENNA SYSTEM, COMMUNICATION DEVICE, CALIBRATION METHOD OF ACTIVE ANTENNA SYSTEM AND RECORDING MEDIUM

This application is based upon and claims the benefit of priority from Japanese Patent Application No. 2017-150026, filed on Aug. 2, 2017, the disclosure of which is incorporated herein in its entirety by reference.

TECHNICAL FIELD

The present invention relates to an active antenna system, a communication device, a calibration method of an active antenna system and a recording medium.

BACKGROUND ART

It is assumed that an active antenna system (Active Antenna System: AAS) equipped with a Massive-MIMO (multiple-input and multiple-output) function by Beamforming is used in a fifth generation mobile communications system (Fifth Generation: 5G) which is on its way of being formulated by Third Generation Partnership Project (3GPP). By making use of this technology, it is intended to realize requirements of further capacity increase, further speedup and a shorter delay in mobile communication and wireless communication.

Moreover, in this technology, there is a systematic characteristic that, based on UL (Up Link) Sounding information transmitted from each terminal (User Equipment: UE) to an AAS, Beamforming for directing the directivity of the antenna to a UE of a DL (Down Link) direction is performed. (Time Division Duplex: TDD). In such Beamforming, the reversibility between the space propagation characteristics in UL and the space propagation characteristics in DL (DL/UL Reciprocity) that is seen between an AAS and each UE is used.

In order to establish an accurate Beamforming property and Beamforming controllability for an AAS, it is necessary to compensate and equalize variations of the frequency characteristics of the amplitude and the phase of transmitter-receivers respectively connected to a plurality of antennas. Therefore, calibration (CAL) of the transmitter-receivers is indispensable.

Here, measurement and compensation for CAL to equalize frequency characteristics of the amplitude and the phase of transmission signals of a plurality of transmitters is called DL CAL, and measurement and compensation for CAL to equalize the frequency characteristics of the amplitude and the phase of received signals of receivers is called UL CAL.

A configuration of a general AAS and a method of UL/DL CAL measurement will be described with reference to FIGS. 6 to 8.

FIG. 6 illustrates a general AAS.

An AAS 200 includes transmitter-receivers (TRX) 42 and a transmission-reception baseband unit (TRX-baseband) 43 mainly.

Switches 44 that switch between transmission and reception are respectively connected to antennas 41, and separate signal lines for transmission and for reception are connected to each of the switches 44. The signal lines are connected to the TRX 42 via amplifiers 45. The TRX 42 are respectively connected to the TRX-baseband 43 by signal lines for transmission and for reception, and the TRX-baseband 43 is connected to an interface 49 such as an optical transceiver and the like. The AAS 200 is connected, via the interface 49, to an external Digital Part 201 into which a Beamforming function is built in.

Signal lines that branch from signal lines respectively connecting the antennas 41 to the switches 44 are connected to a calibration network unit 46 (hereinafter, referred to as a CAL Network unit 46). The CAL Network unit 46 is a CAL signal transmission path including a divider or a switch. The CAL Network unit 46 is connected to a switch 47 that switches between transmission and reception. The switch 47 is connected to a CAL transmitter-receiver 48. The CAL transmitter-receiver 48 transmits a signal for UL CAL to the TRX 42. Also, the CAL transmitter-receiver 48 receives a signal transmitted by the TRX 42 for DL CAL, and transmits a signal for DL CAL to the TRX-baseband 43.

Next, operations when the AAS 200 that is a general AAS performs calibration will be described with reference to FIG. 7.

Note that description will be omitted about how to obtain correction values for the amplitude and the phase at the time of calibration, because it is not an object of the present invention.

FIG. 7 indicates an example of a frame format of a LTE TDD (Long Term Evolution Time Division Duplex) system specified by 3GPP, and the horizontal axis indicates a time. The upper four stages are charts illustrating operations of the AAS 200, and the lower four stages are charts illustrating operations of a terminal (UE).

For the purpose of understanding, FIG. 8 indicates the states of DL CAL and UL CAL indicated by the frame format of FIG. 7 in such a way that the horizontal axis is made to be a time and the vertical axis be the transmission output of the TRX 42 of the AAS.

In FIG. 7, "DL Timing" indicates a state of a Special Sub Frame (SSF: a single Subframe disposed between a UL Subframe and a DL Subframe) of the AAS and states of frames before and behind the SSF, and the DL timing of the AAS is indicated in gray.

TX ON/OFF of AAS indicates a time during when the transmitters of the TRX 42 are operating in gray.

UL Timing indicates a state of a SSF in a UE and frames before and behind the SSF, and the UL timing of the UE is indicated in gray.

When the frame format of the DL timing and the frame format of the UL timing mentioned above are compared, the DL timing is delayed by 624×Ts from the UL timing. Here, Ts is the base unit when expressing the size of a frame of LTE, and is about 32.6 ns (=1/(30.72 MHz)). Accordingly, 624×Ts is about 20.3 μs. Such difference between the frame timing of DL and the frame timing of UL is described in 3GPP TS36.211, 8 Uplink-downlink frame timing. This difference in frame timing is needed physically at the time of ON/OFF of a transmitter-receiver of each of a base station including an AAS and a terminal. That is, it is specified such that a start-up of a transmitter-receiver before transmitting or receiving a signal and a shutdown of a transmitter-receiver after transmitting or receiving a signal shall be performed in such difference time.

RX ON/OFF of AAS indicates a time during when the receivers of the TRX 42 are operating in gray.

Description will be omitted about the charts of UE because the charts indicate operations of a UE in accordance with the charts of AAS.

As illustrated in FIG. 7, in a situation that the general AAS 200 operates, DL calibration is carried out in a GP (Guard Period) after DwPTS (Downlink Pilot Time Slot) of the DL timing. UL calibration is carried out just before UpPTS (Uplink Pilot Time Slot) of the UL timing within the GP. However, a time to be assigned to DL calibration and UL calibration will be a time length of a short-interval made by subtracting, from one-Subframe length of Special Sub Frame (SSF), the length of DwPTS, the length of UpPTS and 20.3 microseconds of Uplink-downlink frame timing. Therefore, a high speed is required for conducting DL calibration and UL calibration.

Further, calibration is performed and updated one after another during communication.

In patent document 1, there is a statement about calibration of a communication system using a plurality of antenna elements.

Patent Document

[Patent document 1] WO 2016/163375

With increase of the communication capacity in recent years, data signal intervals of DL and UL are becoming to be reserved long, and thus the GP of a Special Sub Frame tends to become short. In the standard of 5G which is under consideration by 3GPP, it is planned to achieve capacity increase and a shorter-delay property by employing Scalable OFDM which makes the Sub Carrier interval of OFDM be $2^n$ times of 15 kHz of the current LTE and an OFDM Symbol length be shortened to $1/(2^n)$. Here, $2^n$ represents nth power of 2. Also in this case, along with shortening of a Frame length and a DL/UL Subframe length, a GP length of a Special Sub Frame also becomes short.

When a GP becomes short, a time of transition from DL calibration to UL calibration becomes short, and thus a time zone during when a DL CAL signal is measured during TX ON and a time zone during when a UL CAL signal is measured during RX ON become close.

Even if transmission of a DL CAL signal is ended, the TRX 42 are in a state of TX_ON for a while. Here, in a case where the TRX 42 adopt a direct modulation system, if the TX_ON state is continued, a leak (LO leak) wave of a transmission local oscillator (Local Oscillator: LO) occurs. Such transmission LO leak wave slightly sneaks into the reception systems of the TRX 42 from the transmission systems. Then, when a time zone during when a DL CAL signal is measured in TX ON and a time zone during when a UL CAL signal is measured in RX ON are close, a transmission LO leak wave is received at the center of the bandwidth in the reception systems of the TRX 42 that have become RX_ON.

In a case where the receivers are of a direct conversion method, a transmission LO leak wave located in the center of the bandwidth appears at the zero frequency in the baseband, that is, in the baseband IQ region as a DC (Direct Current) Offset. Thus, when a DC Offset due to a transmission LO leak has appeared in the reception baseband, the reception DC Offset compensation function of a receiver is forced to work. As a result, the receiver tries to compensate a DC component derived from the transmission LO leak wave which is not an original compensation target (that is, DC Offset which occurs in the baseband due to the receiver itself), and thus overcompensation will be performed.

In this way, when reception DC offset overcompensation which is not intended by the receiver side occurs once, the following phenomenon occurs during a reception setting due to transmission OFF after that. In other words, although the reception DC Offset derived from a transmission LO leak disappears, a DC Offset transient response occurs in a reception IQ baseband during a time period until the DC Offset overcompensation state converges to a state of a DC Offset compensation value of the receiver origin. Therefore, when the transient response does not converge by a time zone in which a UL CAL signal exists, a DC Offset overlaps on a UL CAL signal, and, by this, the state of the amplitude and the phase of the UL CAL signal changes from its original characteristics. Along with this, when UL CAL correction is performed still including such error components, a correction error will be caused in UL calibration of the TRX 42.

Moreover, when the TRX 42 perform UL Sounding still having such correction errors of UL calibration, and then perform DL Beamforming and Nulling based on the UL transmission information of the UL Sounding, the performance of the DL Beamforming and the Nulling degrades compared with an expected state. (Nulling is to null a radiating pattern in the direction of another terminal at the time of MU-MIMO Spatial Multiplex.) As a result, SINR at the time of MU-MIMO Spatial Multiplex degrades, and deterioration of the throughput to each terminal and degradation of the throughput performance of the whole cell will be caused.

SUMMARY

In view of the issues mentioned above, an object of the present invention is to provide an active antenna system, a communication device, a calibration method of an active antenna system and a recording medium, which enable calibration that does not cause a correction error.

Means for Solving the Problems

In order to achieve the above-mentioned object, an active antenna system of the present invention includes: a plurality of antennas; a plurality of switches respectively connected to the antennas, the switches being configured to switch between transmission signal lines and reception signal lines to perform Time Division Duplex; a plurality of transmitter-receivers respectively connected to the transmission signal lines and to the reception signal lines; a calibration transmitter connected to the transmission signal lines; a calibration receiver connected to the reception signal lines; and a control unit configured to carry out, during a receiving time in the Time Division Duplex, reception calibration of each of the transmitter-receivers based on a signal transmitted by the calibration transmitter and received by the transmitter-receivers, and, during a transition time from reception to transmission, carry out transmission calibration of each of the transmitter-receivers based on a signal transmitted by the transmitter-receivers and received by the calibration receiver.

In order to achieve the above-mentioned object, a communication device of the present invention includes an active antenna system including: a plurality of antennas; a plurality of switches respectively connected to the antennas, the switches being configured to switch between transmission signal lines and reception signal lines to perform Time Division Duplex; a plurality of transmitter-receivers respectively connected to the transmission signal lines and to the reception signal lines; a calibration transmitter connected to the transmission signal lines; a calibration receiver connected to the reception signal lines; and a control unit configured to carry out, during a receiving time in the Time Division Duplex, reception calibration of each of the transmitter-receivers based on a signal transmitted by the calibration transmitter and received by the transmitter-receivers, and, during a transition time from reception to transmission, carry out transmission calibration of each of the transmitter-receivers based on a signal transmitted by the transmitter-receivers and received by the calibration receiver.

In order to achieve the above-mentioned object, a calibration method of an active antenna system of the present invention carries out: during a receiving time in Time Division Duplex, reception calibration of each of a plurality of transmitter-receivers based on a signal transmitted by a calibration transmitter and received by the transmitter-receivers, and, during a transition time from reception to transmission, carrying out transmission calibration of each of the transmitter-receivers based on a signal transmitted by the transmitter-receivers and received by a calibration receiver.

In order to achieve the above-mentioned object, a recording medium of the present invention is a computer-readable recording medium recording a program which makes a computer execute carrying out, during a receiving time of Time Division Duplex, reception calibration of a plurality of transmitter-receivers each connected to each of a plurality of antennas based on a signal received by the plurality of antennas, and carrying out, during a transition time from reception to transmission, transmission calibration of the transmitter-receivers based on a signal transmitted by the antennas.

Advantages of the Invention

According to the present invention, an active antenna system, a communication device, a calibration method of an active antenna system and a recording medium can make it possible to carry out calibration without causing a correction error.

BRIEF DESCRIPTION OF THE DRAWINGS

Exemplary features and advantages of the present invention will become apparent from the following detailed description when taken with the accompanying drawings in which:

FIG. 8 is a diagram illustrating operations of related technology.

EXAMPLE EMBODIMENT

First Example Embodiment

Next, an example embodiment of the present invention will be described in detail with reference to FIG. 1.

Figure 1:
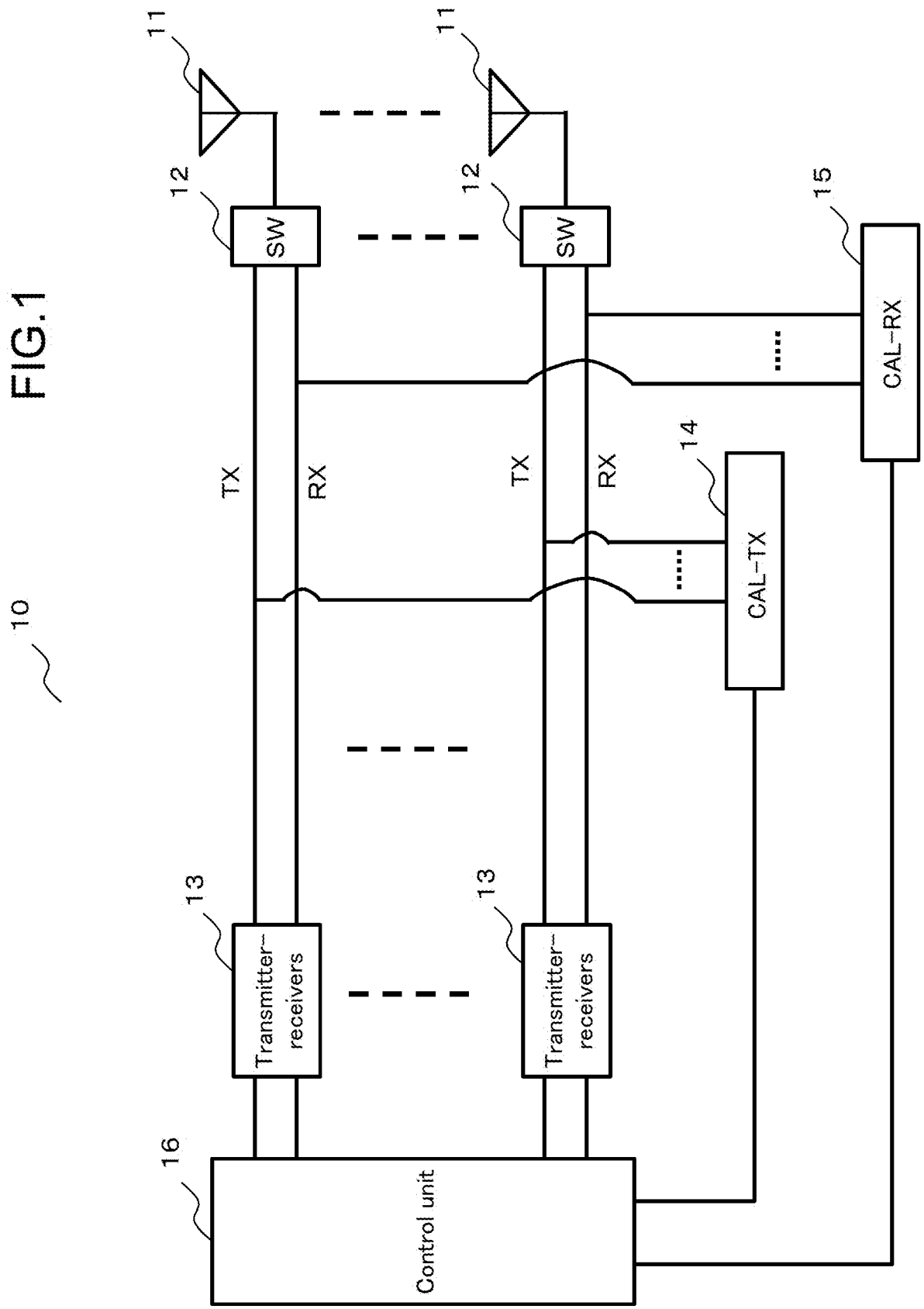
FIG. 1 is a diagram illustrating an exemplary configuration of a first example embodiment.

FIG. 1 is an example configuration of an active antenna system of this example embodiment.

An active antenna system 10 according to this example embodiment includes: a plurality of antennas 11; switches 12 that are respectively connected to the antennas, perform switching between transmission signal lines and reception signal lines, and perform Time Division Duplex; and transmitter-receivers 13 respectively connected to the transmission signal lines and the reception signal lines. The active antenna system 10 also includes one calibration transmitter 14 connected to the transmission signal lines, and one calibration receiver 15 connected to the reception signal lines. Further, the active antenna system 10 includes a control unit 16. During a receiving time of the above-mentioned Time Division Duplex, the control unit 16 carries out reception calibration of each of the transmitter-receivers 13 based on a signal which the calibration transmitter 14 transmits and the transmitter-receivers 13 receive. Also, during a transition time from reception to transmission, the control unit 16 carries out transmission calibration of each of the transmitter-receivers 13 based on a signal which the transmitter-receivers 13 transmit and the calibration receiver 15 receives.

By doing so, in the active antenna system 10 according to the present example embodiment, a leak wave of a transmitter is not mixed at the time of calibration, and thus calibration which does not cause a correction error can be carried out.

Second Example Embodiment

Next, the second example embodiment will be described with reference to FIGS. 2 to 8.
(Description of the Structure)

Figure 2:
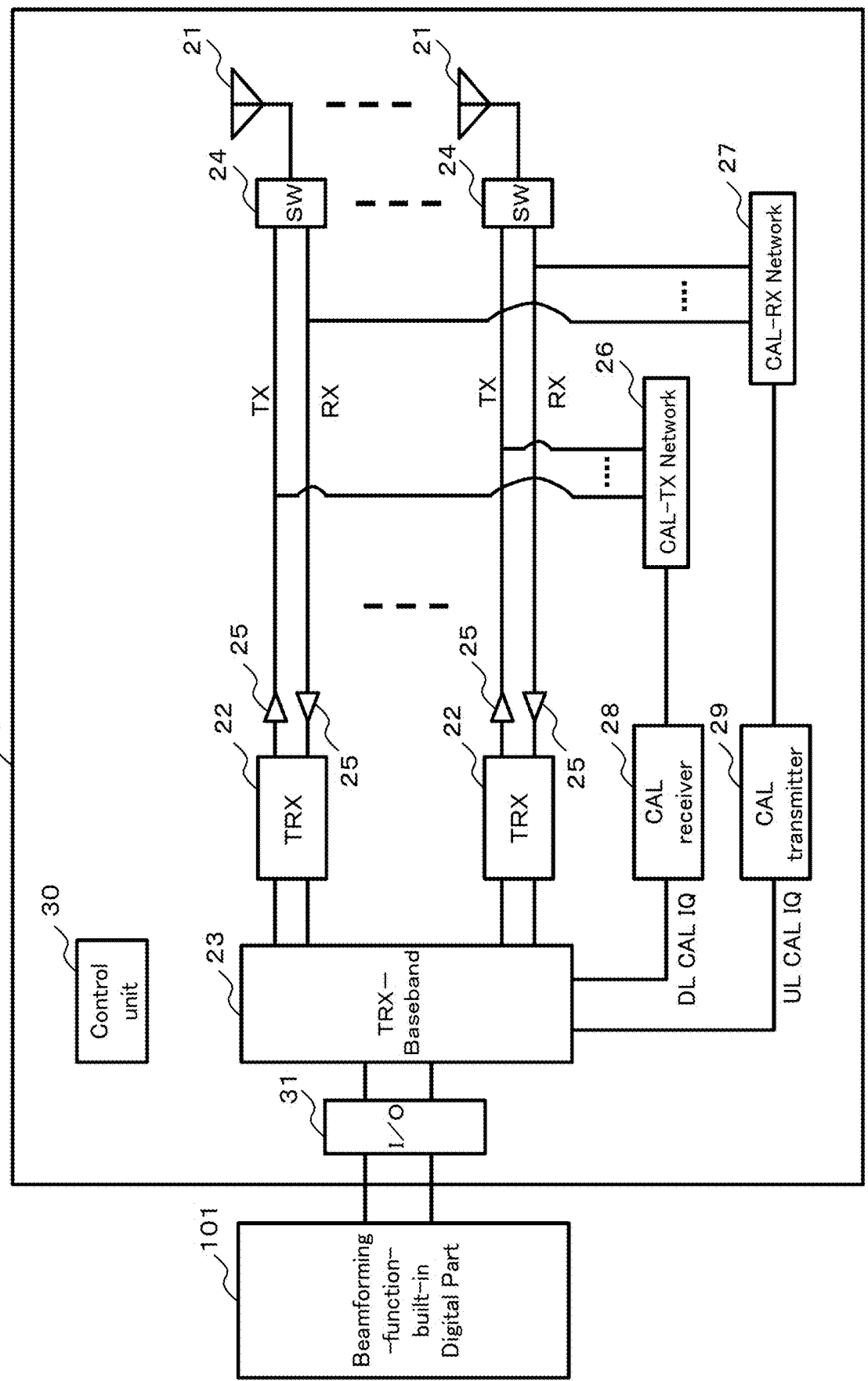
FIG. 2 is a diagram illustrating an exemplary configuration of a second example embodiment.

FIG. 2 is an example configuration of an AAS 100 of the second example embodiment.

In order to realize TDD, switches 24 that switch between transmission and reception are respectively connected to a plurality of antennas 21.

To each of the switches 24, separate signal lines for transmission and for reception are connected, and the signal lines are connected to respective transmitter-receivers 22 via amplifiers 25.

Each of the transmitter-receivers 22 is a transmitter-receiver including respective circuits for transmission and for reception, performs conversion between a high frequency and a baseband by Orthogonal Modulation/Demodulation, and transmits and receives a signal to and from a TRX-Baseband 23.

Each of the transmitter-receivers 22 is connected to the TRX-Baseband 23 by separate signal lines for transmission and for reception. The TRX-Baseband 23 performs communication processing for transmission and reception in a baseband.

A transmission CAL Network (CAL-TX Network) 26 is connected to the transmission signal lines of the plurality of switches 24. Also, a reception CAL Network (CAL-RX Network) 27 is connected to the reception signal lines of the plurality of switches 24. The CAL-TX Network 26 and the CAL-RX Network 27 may be realized by an electrical distributor or a switch.

The CAL-TX Network 26 is connected to a CAL receiver 28. The CAL receiver 28 is a receiver that receives a DL signal for calibration which the transmitter-receivers 22 generate for performing DL CAL, performs orthogonal demodulation further to convert a high frequency signal into a baseband signal, and transmits the converted signal to the TRX-Baseband 23.

The CAL-RX Network 27 is connected to a CAL transmitter 29. The CAL transmitter 29 is a transmitter which performs orthogonal modulation to convert a signal from the TRX-Baseband 23 into a high frequency, and generates a UL signal for calibration for performing UL CAL.

The TRX-Baseband 23 is connected to an interface 31 such as an optical transceiver and the like. Then, the AAS 100 is connected to an external Beamforming-function-built-in Digital Part 101 via the interface 31.

A control unit 30 includes a CPU (Central Processing Unit), controls the hardware of the AAS 100, and performs software processing.

Next, the TRX-Baseband 23 has a function to perform calibration in a baseband, and corrects the amplitude and the phase of each transmitter-receivers 22.

(Description of Operations)

Next, operations of the present example embodiment will be described with reference to FIGS. 3 to 5.

Note that how to obtain correction values of the amplitude and the phase at the time of calibration is not the object of the present invention, and thus description will be omitted.

Figure 3:
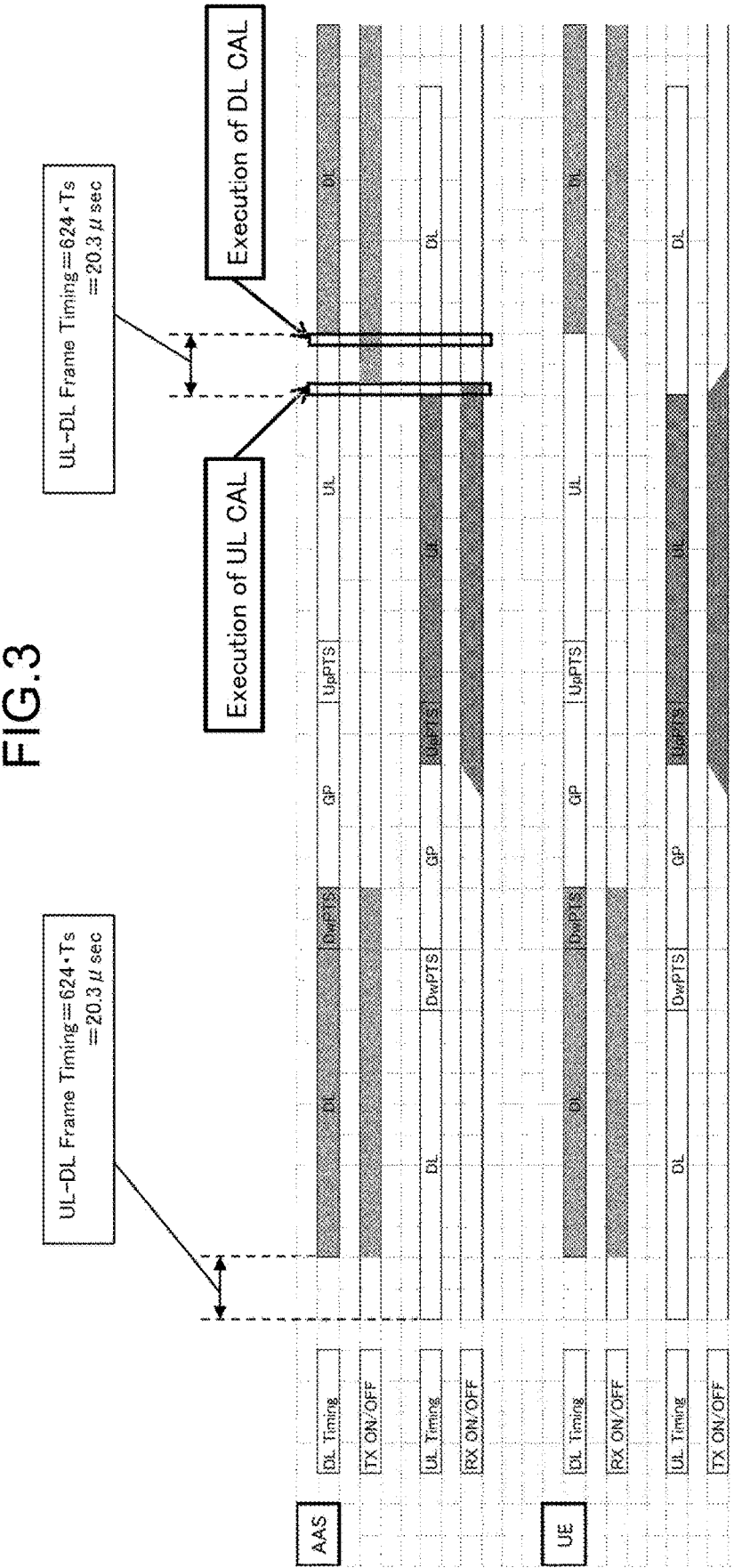
FIG. 3 is a diagram illustrating operations of the second example embodiment.

FIG. 3 indicates an example of a frame format of a LTE TDD system specified by 3GPP, and the horizontal axis indicates a time. The upper four stages are charts illustrating operations of the AAS 100, and the lower four stages are charts illustrating operations of a terminal (UE).

Figure 4:
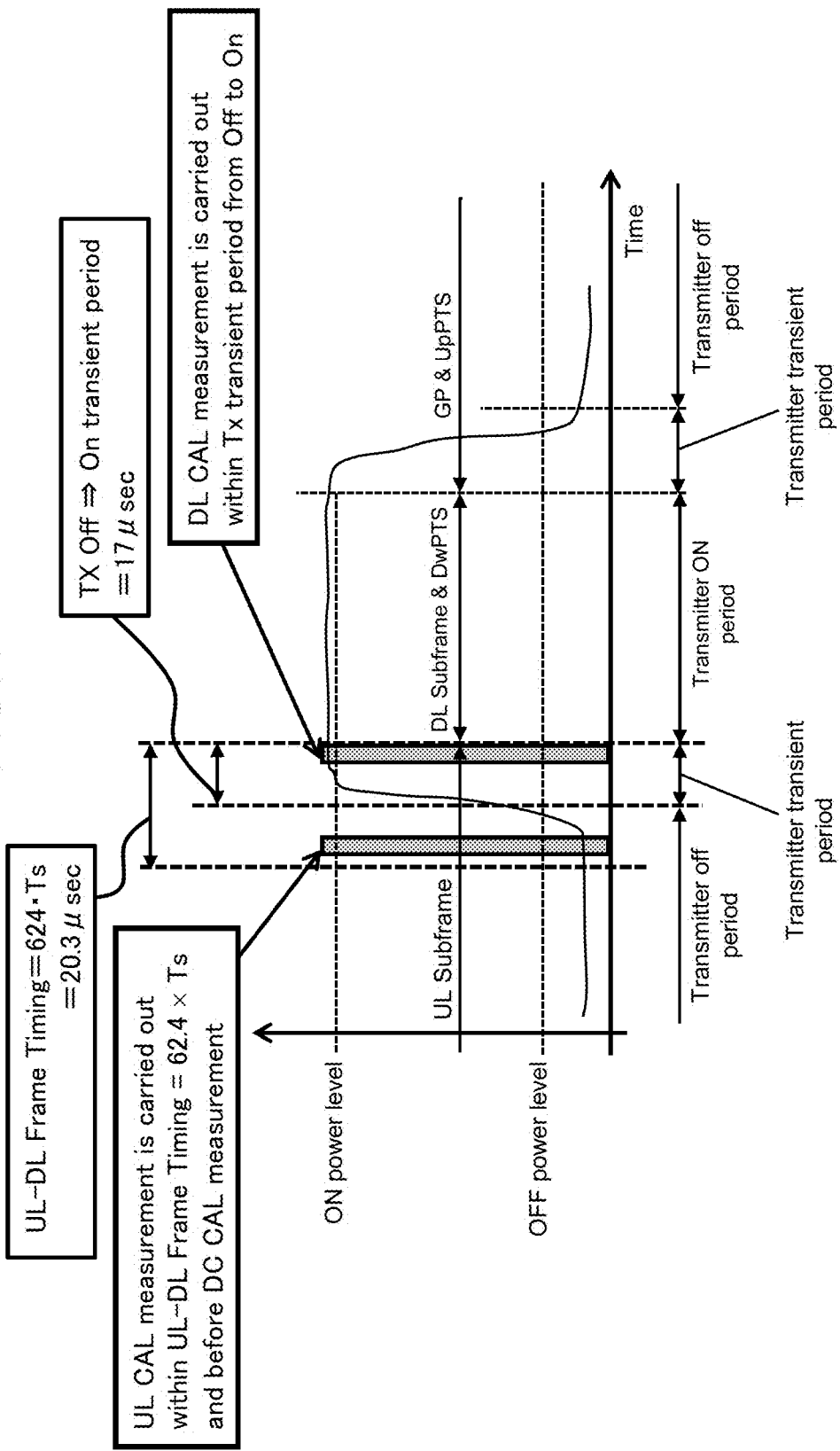
FIG. 4 is a diagram illustrating operations of the second example embodiment.
Figure 5:
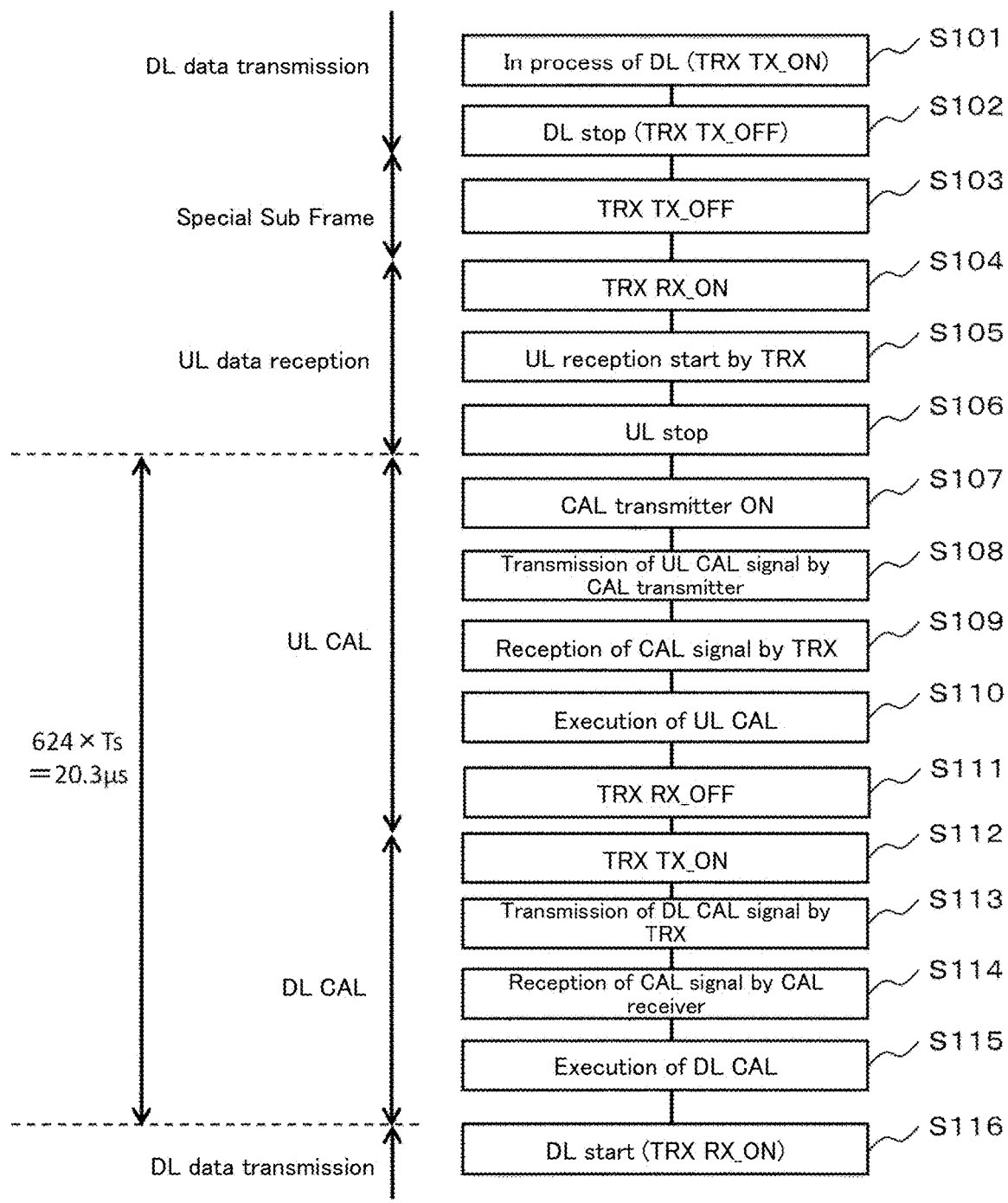
FIG. 5 is a diagram illustrating operations of the second example embodiment.
Figure 6:
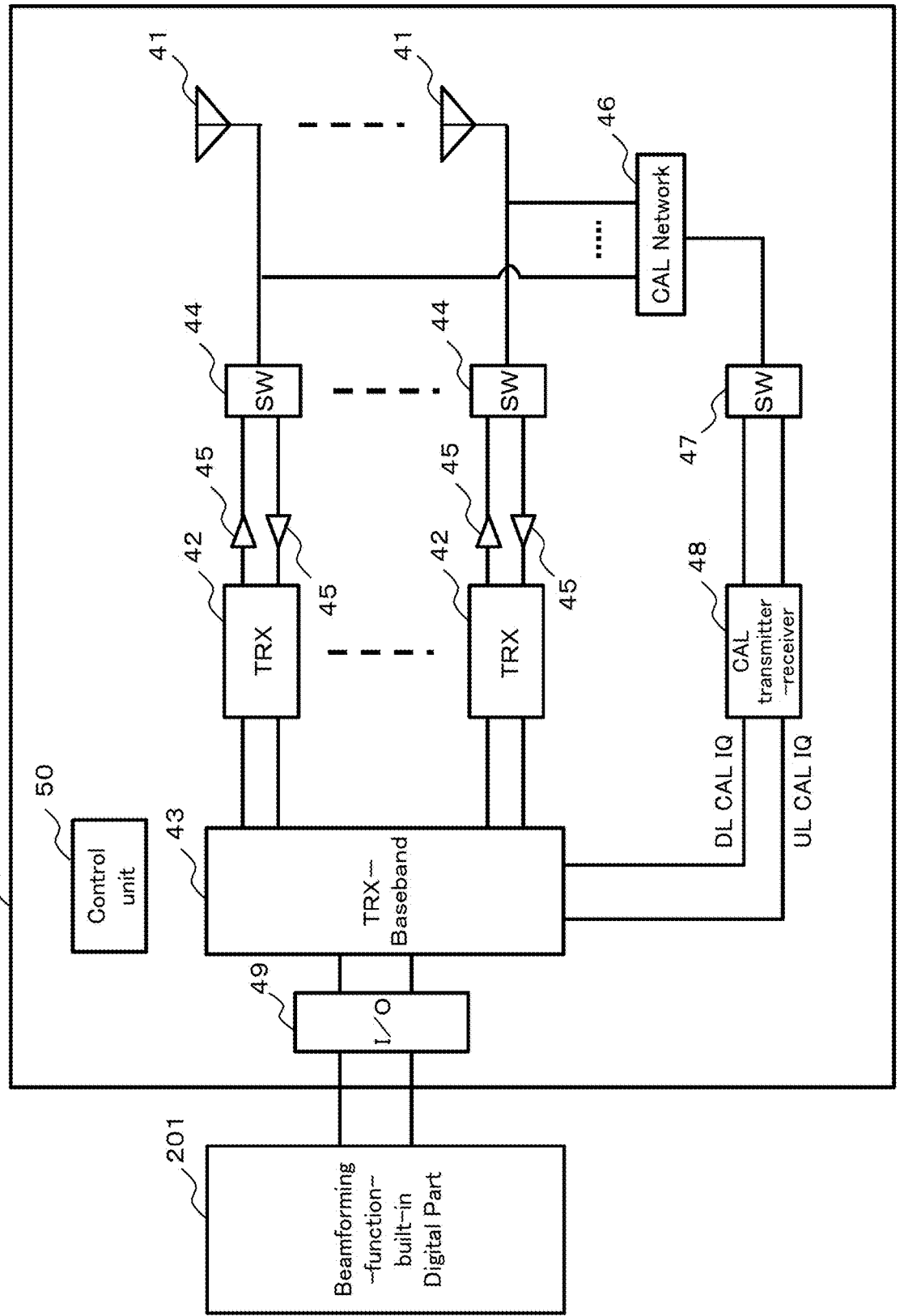
FIG. 6 is a diagram illustrating an exemplary configuration of related technology.
Figure 7:
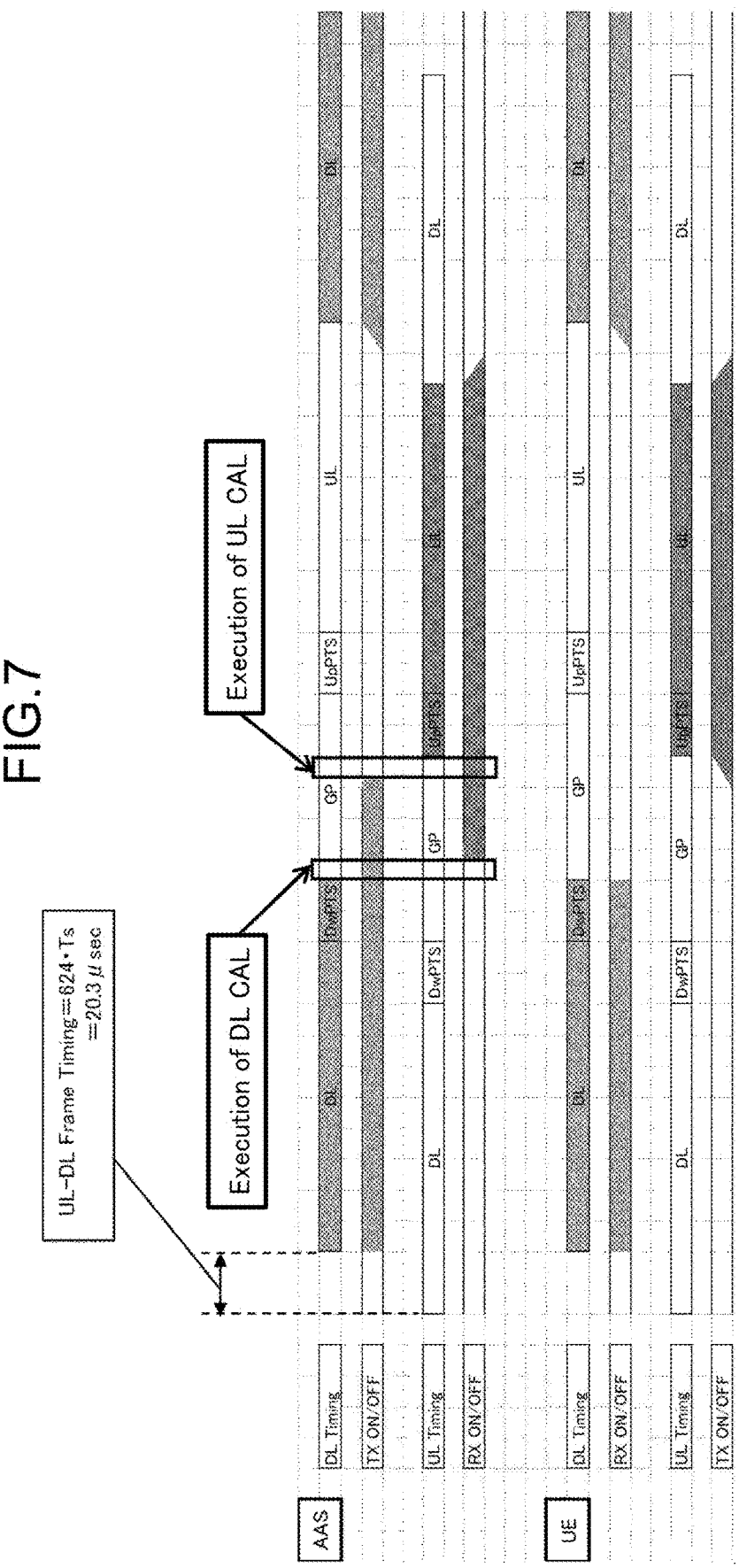
FIG. 7 is a diagram illustrating operations of related technology.

For understanding, FIG. 4 indicates the states of UL CAL and DL CAL indicated by the frame format of FIG. 3 in a manner making the horizontal axis be a time and the vertical axis be a transmission output of the transmitter-receivers 22 of an AAS.

In FIG. 3, "DL Timing" indicates a state of a Special Sub Frame (SSF) and frames before and behind the SSF, and DL timing of the AAS is indicated in gray.

TX ON/OFF in AAS indicates a time during when the transmitters of the transmitter-receivers 22 are operating in gray.

UL Timing indicates UL timing of a UE in gray.

When the frame format of the above-mentioned DL timing and the frame format of the UL timing are compared, the DL timing is delayed by 624×Ts from the UL timing. Ts and a difference between the frame timing of DL and the frame timing of UL are similar to those in the description of the paragraphs of Background Art.

In FIG. 3, "RX ON/OFF" of AAS indicates a time during when the receivers of the transmitter-receivers 22 are operating in gray.

Since the charts of UE indicate operations of UE in accordance with the charts of AAS, description will be omitted.

The AAS 100 according to the present example embodiment carries out UL CAL first, and carries out DL CAL next.

The outline of operations including operations before and after UL CAL and DL CAL will be described with reference to FIG. 5. FIG. 5 is an outline of operations for explanation, and detailed timing is illustrated in FIG. 3.

First, the AAS 100 is in process of carrying out DL (S101).

In Step S101, the transmitters of the transmitter-receivers 22 are in an ON state.

Next, a DL sub-frame ends, and DL stops (S102).

Following Step S102, a Special Sub Frame starts, and the transmitters of the transmitter-receivers 22 become OFF (S103).

Next, a UL sub-frame starts, and the receivers of the transmitter-receivers 22 become ON (S104).

The transmitter-receivers 22 begin to receive UL data transmitted from a UE (S105).

The UL sub-frame ends, and UL stops (S106).

Next, the CAL transmitter 29 becomes ON (S107).

The CAL transmitter 29 transmits a signal for UL calibration (S108).

The signal for UL calibration is received by the transmitter-receivers 22 via the CAL-RX Network 27 and the amplifiers 25 (S109).

The signal for UL calibration received by the transmitter-receivers 22 is transmitted to the TRX-Baseband 23 as a signal in the band of the baseband. Based on information of the signal for UL calibration, the TRX-Baseband 23 obtains correction values of the amplitude and the phase in the TRX-Baseband 23 in such a way that the frequency characteristics of the amplitude and the phases of received signals of all transmitter-receivers 22 become similar, and then multiplies the received signals by the correction values (S110).

Following Step S110, in Step S111, the transmitter-receivers 22 turn off the receivers (S111).

Referring to FIG. 3, in the UL CAL operation, UL CAL is carried out within a time period from the end of UL to the beginning of DL, that is, within 624×Ts, and just after the end of UL. By doing so, the transmitter-receivers 22 have finished transmission two frames before, and thus the transmitting function of the transmitter-receivers 22 are in an off state completely. Therefore, there are no cases that a leak wave of the transmission local oscillator of the transmitter-receivers 22 is received by the transmitter-receivers 22.

Following Step S110, DL CAL is carried out within a time period from the end of UL by the UE to the beginning of DL by the AAS 100, that is, within 624×Ts, and just before the beginning of DL.

The transmitter-receivers 22 make the transmitters ON (S112).

The transmitter-receivers 22 transmit a signal for DL calibration (S113).

The signal for DL calibration is received by the CAL receiver 28 via the amplifiers 25 and the CAL-TX Network 26 (S114).

The signal for DL calibration received by the CAL receiver 28 is transmitted to the TRX-Baseband 23 as a signal in the band of the baseband. Based on information of the signal for DL calibration, the TRX-Baseband 23 obtains correction values of the amplitude and the phases in the TRX-Baseband 23 in such a way that frequency characteristics of the amplitude and the phases of transmission signals of the transmitter-receivers 22 become similar, and multiplies the transmission signals by the correction values (S115).

Here, the CAL receiver 28 is a circuit separated from the CAL transmitter 29, and thus even if the interval from the end of UL CAL to the beginning of DL CAL is short, a leak wave of the local oscillator of the CAL transmitter 29 does not get mixed in the CAL receiver 28 just after the end of UL CAL.

Following Step S115, a DL sub-frame starts, and the transmitter-receivers 22 transmit a DL signal (S116).

As it has been described above, a leak wave of a transmitter does not get mixed at the time of calibration, and thus the AAS 100 of the present example embodiment can carry out calibration without causing a correction error.

Although the preferred example embodiments of the present invention have been described above, the present invention is not limited to the above-mentioned example embodiments, and the present invention can be extended or modified as follows.

The active antenna system indicated by the first example embodiment or the second example embodiment may be used for a communication device which makes the active antenna system be a part of its function.

The present invention is applicable also in a case where an information processing program which realizes the functions of the example embodiments is supplied to a system or a device directly or remotely.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The invention claimed is:

1. An active antenna system, comprising:
    a plurality of antennas;
    a plurality of switches respectively connected to the antennas, the switches being configured to switch between transmission signal lines and reception signal lines to perform Time Division Duplex;
    a plurality of transmitter-receivers respectively connected to the transmission signal lines and to the reception signal lines;
    a calibration transmitter connected to the transmission signal lines;
    a calibration receiver connected to the reception signal lines; and
    a control unit configured to carry out, during a transition time from a receiving time to a transmitting time in the Time Division Duplex, a reception calibration of each of the transmitter-receivers using a signal transmitted by the calibration transmitter and received by the transmitter-receivers, and, during the same transition time, which carries out the reception calibration, carry out transmission calibration of each of the transmitter-receivers using a signal transmitted by the transmitter-receivers and received by the calibration receiver after carrying out the reception calibration.

2. The active antenna system according to claim 1, wherein the Time Division Duplex is an LTE-TDD system specified by 3GPP,
    wherein a measurement time of the reception calibration is during a period from time earlier than start time of a Transmitter ON period by UL-DL Frame Timing to measurement start time of the transmission calibration, and
    wherein a measurement time of the transmission calibration performed during the transition time is within the Transmitter transient period.

3. The active antenna system according to claim 1, wherein the active antenna system further comprises a transmission-reception baseband unit, to which the transmitter-receivers are connected, and
    wherein the reception calibration of the transmitter-receivers and the transmission calibration of the transmitter-receivers is carried out to the transmission-reception baseband unit.

4. A communication device, comprising:
    an active antenna system according to claim 1.

5. The active antenna system according to claim 1, wherein each of the transmitter-receivers comprises a local oscillator.

6. A calibration method of an active antenna system, the calibration method comprising:
    carrying out, during a transition time from a receiving time to a transmitting time in Time Division Duplex, a reception calibration of each of a plurality of transmitter-receivers using a signal transmitted by a calibration transmitter and received by the transmitter-receivers, and, during the same transition time, which carries out the reception calibration, carrying out transmission calibration of each of the transmitter-receivers using a signal transmitted by the transmitter-receivers and received by a calibration receiver after carrying out the reception calibration.

7. The calibration method of an active antenna system according to claim 6, wherein the Time Division Duplex is an LTE-TDD system specified by 3GPP,
    wherein a measurement time of the reception calibration is during a period from time earlier than start time of a Transmitter ON period by UL-DL Frame Timing to measurement start time of the transmission calibration, and
    wherein a measurement time of the transmission calibration performed during the transition time is within the Transmitter transient period.

8. The calibration method of an active antenna system according to claim 6, wherein the reception calibration of the transmitter-receivers and the transmission calibration of the transmitter-receivers is carried out to a transmission-reception baseband unit connected to the transmitter-receivers.

9. A non-transitory computer-readable recording medium recording a program which, if executed, makes a computer execute a method comprising:
    carrying out, during a transition time from a receiving time to transmitting time of Time Division Duplex, a reception calibration of a plurality of transmitter-receivers each connected to each of a plurality of antennas using a signal received by the plurality of antennas, and carrying out, during the same transition time, which carries out the reception calibration, transmission calibration of the transmitter-receivers using a signal transmitted by the antennas after carrying out the reception calibration.

10. The computer-readable recording medium according to claim 9, wherein the Time Division Duplex is an LTE-TDD system specified by 3GPP,
    wherein a measurement time of the reception calibration is during a period from time earlier than start time of a Transmitter ON period by UL-DL Frame Timing to measurement start time of the transmission calibration, and
    wherein a measurement time of the transmission calibration performed during the transition time is within the Transmitter transient period.

11. The computer-readable recording medium according to claim 9, wherein the reception calibration of the transmitter-receivers and the transmission calibration of the transmitter-receivers is carried out to a transmission-reception baseband unit connected to the transmitter-receivers.

* * * * *